United States Patent [19]

Arimilli et al.

[11] Patent Number: 5,613,153

[45] Date of Patent: Mar. 18, 1997

[54] COHERENCY AND SYNCHRONIZATION MECHANISMS FOR I/O CHANNEL CONTROLLERS IN A DATA PROCESSING SYSTEM

[75] Inventors: Ravi K. Arimilli, Round Rock; John S. Dodson, Pflugerville; Guy L. Guthrie, Austin; Jerry D. Lewis, Round Rock, all of Tex.

[73] Assignee: International Business Machines Corporation, Armonk, N.Y.

[21] Appl. No.: 316,977

[22] Filed: Oct. 3, 1994

[51] Int. Cl.⁶ ............................. G06F 12/00; G06F 13/00
[52] U.S. Cl. ......................... 395/821; 395/445; 395/462; 395/473; 395/309
[58] Field of Search ................................. 395/306, 308, 395/309, 445, 446, 462, 471, 473, 821, 842

[56] References Cited

U.S. PATENT DOCUMENTS

| | | | |
|---|---|---|---|
| 5,045,996 | 9/1991 | Barth et al. | 395/470 |
| 5,097,532 | 3/1992 | Borup et al. | 395/471 |
| 5,146,603 | 9/1992 | Frost et al. | 395/470 |
| 5,175,826 | 12/1992 | Begun et al. | 395/445 |
| 5,353,415 | 10/1994 | Wolford et al. | 395/306 |
| 5,353,425 | 10/1994 | Malamy et al. | 395/471 |
| 5,367,660 | 11/1994 | Gat et al. | 395/403 |
| 5,404,483 | 4/1995 | Stamm et al. | 395/471 |
| 5,428,761 | 6/1995 | Herlihy et al. | 395/457 |
| 5,434,997 | 7/1995 | Landry et al. | 395/182.1 |

Primary Examiner—Glenn A. Auve
Attorney, Agent, or Firm—Kelly K. Kordzik; Winstead Sechrest & Minick P.C.; Mark E. McBurney

[57] ABSTRACT

An I/O channel controller implements coherency and synchronization mechanisms, which allow the I/O channel controller to provide fully coherent direct memory access operations on a multiprocessor system bus, without implementing a retry protocol. This is made possible by performing delayed cache invalidates for real-time cache coherency conflicts between processors and I/O devices. Furthermore, I/O DMA writes occur real-time to the memory system and without the traditional Read With Intent to Modify (RWITM) operations. Completion of PIO operations has been coupled to the completion of I/O DMA writes operations in order to provide "seamless" I/O synchronization with respect to processor execution. An IOCC implementation has been described which benefits from those techniques by significantly reducing design complexity.

13 Claims, 6 Drawing Sheets

COHERENCY AND SYNCHRONIZATION MECHANISMS FOR I/O CHANNEL CONTROLLERS IN A DATA PROCESSING SYSTEM

CROSS REFERENCE TO RELATED APPLICATIONS

This application for patent is related to the following applications for patent filed concurrently herewith:

EFFICIENT ADDRESS TRANSFER TECHNIQUE FOR A DATA PROCESSING SYSTEM, Ser. No. 08/317,007;

DUAL LATENCY STATUS AND COHERENCY REPORTING FOR A MULTIPROCESSING SYSTEM, Ser. No. 08/316,980;

SYSTEM AND METHOD FOR DETERMINING SOURCE OF DATA IN A SYSTEM WITH INTERVENING CACHES, Ser. No. 08/317,256;

QUEUED ARBITRATION MECHANISM FOR DATA PROCESSING SYSTEM, Ser. No. 08/317,006;

METHOD AND APPARATUS FOR REMOTE RETRY IN A DATA PROCESSING SYSTEM, Ser. No. 08/316,978;

ARRAY CLOCKING METHOD AND APPARATUS FOR INPUT/OUTPUT SUBSYSTEMS, Ser. No. 08/317,976;

DATA PROCESSING SYSTEM HAVING DEMAND BASED WRITE THROUGH CACHE WITH ENFORCED ORDERING, Ser. No. 08/316,979;

ALTERNATING DATA VALID CONTROL SIGNALS FOR HIGH PERFORMANCE DATA TRANSFER, Ser. No. 08/326,190;

LOW LATENCY ERROR REPORTING FOR HIGH PERFORMANCE BUS, Ser. No. 08/326,203.

Each of such cross-referenced applications are hereby incorporated by reference into this Application as though fully set forth herein.

TECHNICAL FIELD OF THE INVENTION

The present invention relates, in general, to data processing systems, and, in particular, to implementing coherency and synchronization within an input/output channel controller in a multiprocessor system.

BACKGROUND OF THE INVENTION

Traditional symmetric multiprocessing systems contain a system bus coupled to one or more processors, system memory and input/output ("I/O") devices (also referred to herein as bus devices). In order to fully support memory, cache and I/O coherency, the system bus employs "retry" protocols to maintain cache consistency. A "retry," which is sent by a bus device after it has snooped, or sampled, an address from the system bus placed there by one of the other bus devices, requires more time in order to determine whether or not a copy of the data represented by the snooped address is contained within an internal cache in a modified form; the retry is sent to the bus device that placed the address on the system bus in order to cause that bus device to again send that bus operation with that address onto the system bus at a later time, thus giving the snooping bus device time to make this determination. However, retry mechanisms typically reduce the overall system performance and add significant complexity to the chip and system designs.

Conventional systems perform cohereney with respect to attached I/O devices in the traditional sense that they provide coherency in much the same way processors provide coherency. When a processor accesses a cache line from system memory, it is the owner of that line and thus has to maintain a certain strict coherency protocol to keep the caches of other devices coherent. For example, if another processor attempts to access that line, the owner of the cache line has to indicate to others that it has that line, and may have to issue a retry. These certain specific rules for coherency can make system designs very cumbersome.

Certain blocks of memory may be cached in the processors or in input/output channel controllers ("IOCC"); both must be maintained as coherent, i.e., it is not desired to have a processor getting something from memory when it has been modified (incoherency). To have a cache within an IOCC means that all the protocols must be supported as they are for the processors. The challenge is that, unlike the processors, IOCCs have multiple asynchronous clocks. The processors have one clock so that they can do things real time. IOCC caches must stay coherent without necessarily working with all the ground rules of cache cohereney protocols.

Prior art techniques basically implement the afore-mentioned cache cohereney logic and run it in an IOCC just like a processor, so that whenever a microchannel master process wants to access data from memory, it is implemented as if a processor is trying to access something from memory. These microchannel masters appear like execution units to the system. They look like a processor with a fixed point unit, floating point unit, etc., reading and writing to memory. The problem with such a configuration is that with IOCCs, it requires a lot of hardware and complexity to maintain I/O coherency.

One of the problems with the asynchronous nature of the I/Os is that on the system bus, within a certain amount of cycles, an IOCC has to indicate whether or not it is going to retry, modify, rerun, etc. a bus operation. However, since in IOCCs the caches are located on the I/O bus side, communication between the system bus logic to the I/O bus logic required to determine whether or not the IOCC has the cache or not causes problems, since without a predefined fixed latency because of the two separate clocks, worse case designs or dual-ported arrays must be implemented.

With dual-ported cache arrays, whenever there is a snoop request that comes in off the system bus side, there is a separate port into the cache directories to implement a real time look up to maintain the fixed time delays of response. Thus, the directory runs the system clock time. With traditional IOCC structures having the actual caches in the I/O interface logic and not in the system interface logic, the IOCC will get a snoop and it will try to directory look-up real time without precisely knowing what is occurring. It just has this associative shadow directory that it is looking up at its clock speed. Therefore, it sometimes has to make some gross assumptions and may retry the system bus when it really did not need to.

As a result, there is a need in the art for a more efficient IOCC design so that degradation of operation of the system bus is not caused by traditional "retry" protocols.

SUMMARY OF THE INVENTION

It is an objective of the present invention to provide a more efficient IOCC design. In an attainment of the above objective, the present invention implements an IOCC wherein data caches and cache controllers are associated with the system bus controller ("SBC") within the IOCC, instead of with the I/O bus controller ("IOBC"). This new structure requires that the IOBC request usage of the cache from the SBC whenever an I/O device begins a direct memory access ("DMA") transfer to/from the system. The SBC will "real-time" grant the IOBC ownership of all of the cache lines within a specific page. Once a DMA transfer is completed, the IOBC will relinquish ownership of this page. During the DMA transfer, if a cache conflict occurs, then the SBC performs a "posted invalidate" operation. This means that the SBC waits until the DMA transfer is completed and then invalidates the appropriate cache lines in the IOCC data cache. The SBC does not retry the system bus during this procedure.

Cache consistency is maintained by the present invention by taking advantage of the fact that I/O DMA transfers are asynchronous to processor execution. Thus, any cache conflicts are coincidental and do not affect data integrity for the current DMA operation. However, to maintain data integrity for future DMA operations, the appropriate cache(s) is invalidated once the current DMA operation is completed.

Since the SBC is the owner of the data caches and cache controller, all snoop "hits" can be resolved either real-time, or in a "posted" manner, and do not require any communication to the IOBC. This then provides a structure such that the SBC never needs to retry system bus operations. Furthermore, in order to minimize design complexity and asynchronous handshaking, the SBC snoops the data caches to the page granularity rather than to the cache line granularity, since many DMA operations are sequential in nature, and operating systems organize memory in pages (and allocate I/O pages for DMA operations). This allows the IOBC to perform only one (page own) request for a long DMA transfer. The SBC does not have to be aware of the exact cache line which is being direct memory accessed. It simply keeps track of the pages which have been direct memory accessed, or are currently being direct memory accessed.

IOBCs typically perform speculative prefetch ahead of cache line during DMA read operations. Thus, the IOBCs do not maintain precise cache level coherency, but rather variable cache level coherency. Thus, the present invention provides page level coherency granularity on the system bus for DMA read data.

During DMA writes to system memory, the SBC uses posted write techniques and cache line write with flush operations rather than actually gaining "ownership" of the cache line. This allows the IOCC write caches to behave as temporary write buffers (rather than actual caches) during DMA writes to system memory. Since the IOCC never owns the cache when the write with flush operation is issued, the IOCC is not required to retry any cache conflicts. Again, the present invention takes advantage of the fact that I/O DMA operations are asynchronous to processor execution.

An advantage of the IOCC coherency mechanism of the present invention is that the IOCC never truly "owns" a cache line.

Yet another advantage of the IOCC coherency mechanism of the present invention is that only page level snooping is performed on the system bus.

And still another advantage of the present invention is that only a single variable cache is needed to transfer a page of DMA read data.

Yet a further advantage of the IOCC coherency mechanism of the present invention is that only a single variable cache is needed for all DMA write data transfers.

Further, another advantage of the IOCC coherency mechanism of the present invention is that only a single status bit (VALID) is required for each page of DMA read data.

Yet a further advantage of the IOCC coherency mechanism of the present invention is that it significantly simplifies design complexity and reduces silicon real estate.

Still another advantage of the IOCC coherency mechanism of the present invention is that it avoids potential system deadlocks and livelocks.

An additional advantage of the IOCC coherency mechanism of the present invention is that it easily accommodates the speculative prefetch ahead concept for DMA read data.

Another advantage of the IOCC coherency mechanism of the present invention is that it takes advantage of the fact that I/O DMA transfers are asynchronous relative to CPU execution.

In order to maintain I/O synchronization without any special I/O flush or sync commands, the IOCC of the present invention takes advantage of the DMA/Interrupt sequence used by all operating systems. When an I/O bus device completes a DMA transfer, it typically interrupts the processor in the system. The processor in turn will either perform a PIO load operation to the I/O master or it will read some status in system memory (which was direct memory accessed by the master). To maintain "seamless" I/O synchronization, the IOCC flushes all DMA write buffers prior to completing any PIO operation, and the IOCC maintains strict ordering during DMA writes to system memory. These two mechanisms allow the IOCC to maintain I/O synchronization without any special sync or flush commands.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

With the foregoing hardware in mind, it is possible to explain the process-related features of the present invention. To more clearly describe these features of the present invention, discussion of other conventional features is omitted as being apparent to those skilled in the art. It is assumed that those skilled in the art are familiar with a multiuser, multiprocessor operating system, and in particular with the requirements of such an operating system for memory management including virtual memory, processor scheduling, synchronization facilities for both processes and processors, message passing, ordinary device drivers, terminal and network support, system initialization, interrupt management, system call facilities, and administrative facilities.

Figure 1:
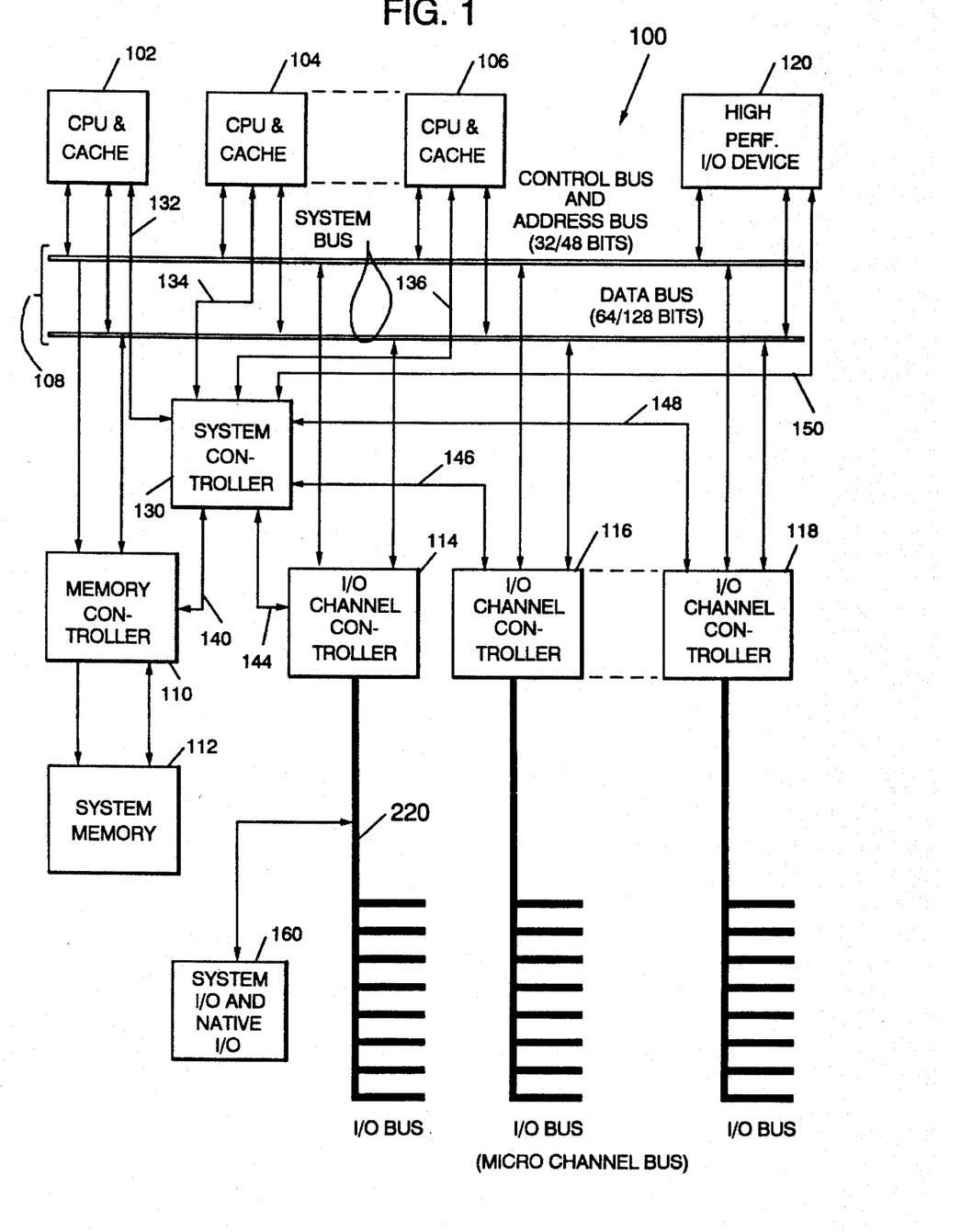
FIG. 1 illustrates a block diagram of a multiprocessor system in accordance with the present invention.

Referring now to FIG. 1, a data processing system which advantageously embodies the present invention will be described. Multiprocessor system 100 includes a number of processing units 102, 104, 106 operatively connected to a system bus 108. Also connected to the system bus 108 is a memory controller 110, which controls access to system memory 112, and I/O channel controllers 114, 116, and 118. Additionally, a high performance I/O device 120 may be connected to the system bus 108. Each of the system elements described 102–120, inclusive, operate under the control of system controller 130 which communicates with each unit connected to the system bus 108 by point to point lines such as 132 to processor 102, 134 to processor 104, 136 to processor 106, 140 to memory controller 110, 144 to I/O channel controller 114, 146 to I/O channel controller 116, 148 to I/O channel controller 118, and 150 to high performance I/O device 120. Requests and grants of bus access are all controlled by system controller 130.

I/O channel controller 114 controls and is connected to system I/O subsystem and native I/O subsystem 160.

Each processor unit 102, 104, 106 may include a processor and a cache storage device.

Figure 5:
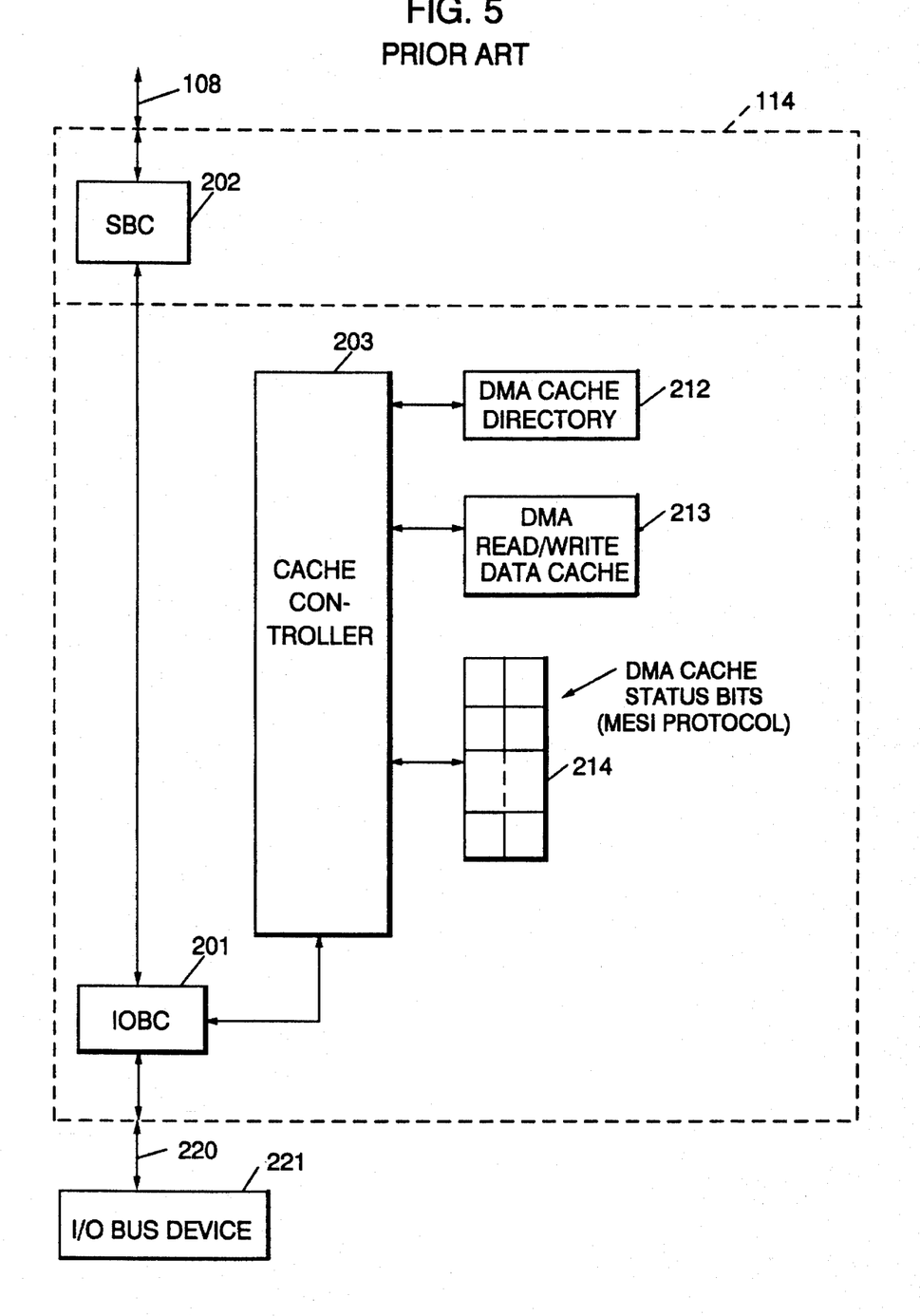
FIG. 5 illustrates a prior art I/O channel controller.

Referring to FIG. 5, there is illustrated a traditional IOCC 114 structure. Within IOCC 114 there is logic 201 for the IOBC, logic 202 for SBC, logic 203 for cache controller, DMA directories 212, DMA caches 213, and DMA cache status bits 214. The traditional IOCCs behave similar to processors in the management of the DMA Data Caches. For example, the DMA Status Bits 216 support the traditional Modified, Exclusive, Shared, Invalid MESI protocol. However, unlike the processor, the IOBC 201 and cache controller 203 operate asynchronously relative to the SBC 202 and system bus 108. The asynchronous boundary between the SBC 202 and DMA cache direction 212 requires the SBC 202, in some cases, to unnecessarily retry the system bus operations. In addition, the IOCC 114 support of the traditional MESI protocol is further complicated by the asynchronous interface.

Figure 2:
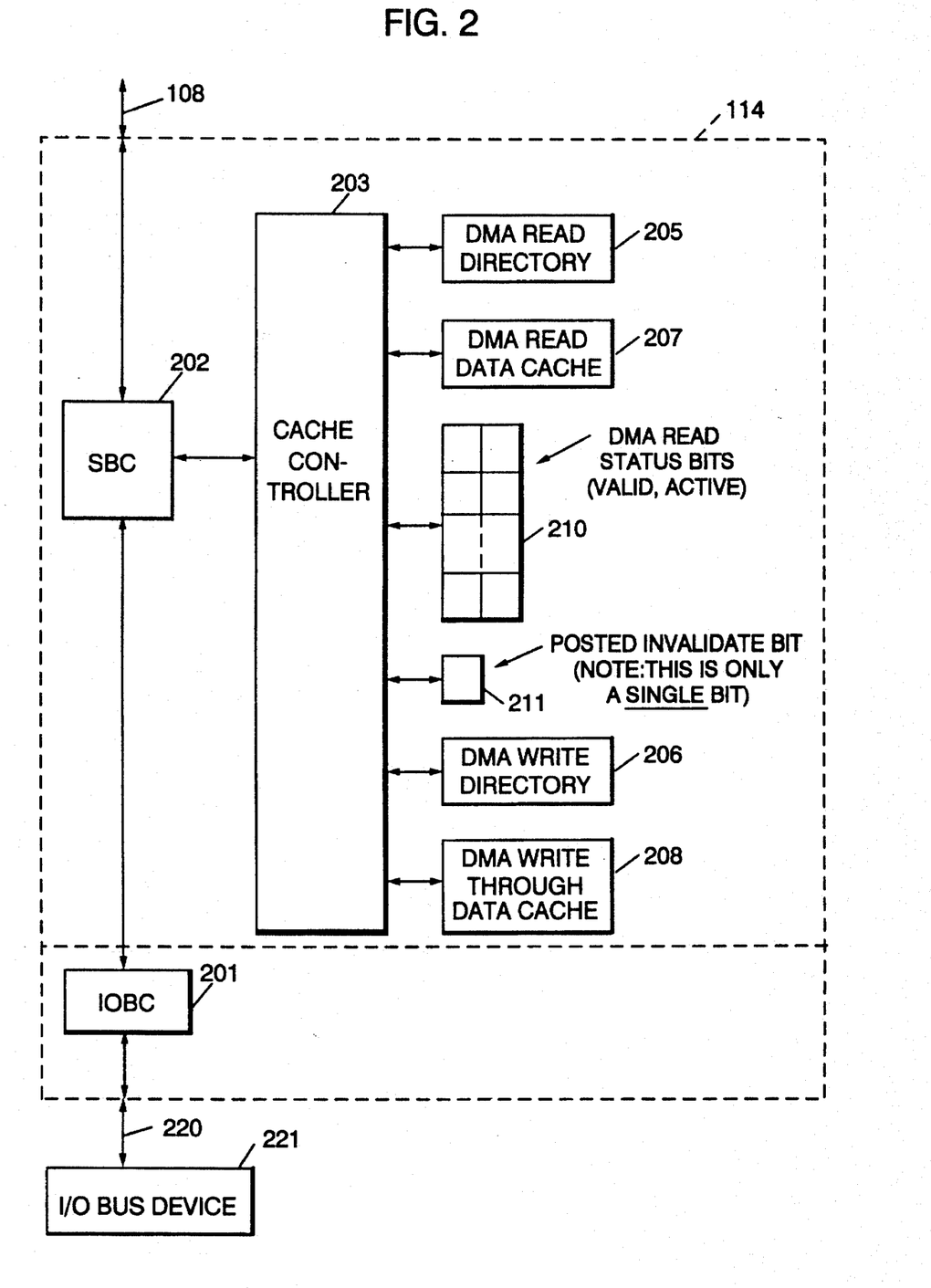
FIG. 2 illustrates a block diagram of an IOCC in accordance with the present invention.

A feature of the present invention is the IOCC 114 structure as shown in FIG. 2. System bus 108 and I/O bus 220 are coupled to IOCC 114. Within IOCC 114 there is logic 201 for the I/O Bus Controller ("IOBC") and logic 202 for the System Bus Controller ("SBC") cache controller 203, I/O data caches 207 and 208, I/O directories 205, 206 and DMA read status bits (Valid, Active) 210, and Posted Invalidate bit (PID) 211. Besides the unique functions described herein, these components operate in typical manners.

The new IOCC 114 structure presented in FIG. 2 significantly contrasts the tradition IOCC 114 structure presented in FIG. 5. The new structure allows the SBC 202 to control the cache controller 203 rather than IOBC 201. This allows the SBC to be the "owner" of the cache facilities and occasionally provide the IOBC with access to the DMA Read Data Cache or the DMA write through data cache. The SBC is then allowed to efficiently snoop system bus operations as well as efficiently perform system bus transfers. The new IOCC 114 structure also has separate data caches for DMA reads and DMA writes. The DMA write cache operates as a write through cache for I/O DMA writes to system memory. (Write through caches are well known in the art.)

The new IOCC then provides or structure to "not" retry snooped system bus operations for DMA writes.

For DMA reads, new DMA read status bits 210, (VALID and ACTIVE) have been provided. The Valid bit indicates that the valid data exists in the DMA read data cache. The Active bit indicates that an I/O bus device is currently performing DMA reads from the addressed DMA read data cache. If the Valid bit is set and the Active bit is reset, then snoop operations may cruise the valid bit to be resent. Furthermore, if the valid bit is set, a "shared" response may be generated. The "Posted Invalidate" bit (PID) indicates that a real-time cache "collision" may have occurred. Instead of retrying system bus snoop operations when an I/O device is performing DMA reads to the same cache (or page) block that a processor is accessing or invalidating, the new IOCC simply sets the PID bit. Once the I/O device relinquishes access to cache page, the PID bit informs the cache controller whether or not to resent the appropriate valid bit. In addition, this new IOCC structure allows the system bus snoop operations to occur on a larger address granularity than the I/O data transfer sizes. This minimizes the asynchronous handshaking between the SBC and IOBC. A feature of this invention is that read data cache directory 205 snoops to the page level (i.e., 4K) address granularity.

Another feature of the present invention is the ability to provide system memory coherency without the use of the system bus retry protocols. This significantly improves system performance by more efficiently utilizing the realizable system bus bandwidth. This is achieved with the use of the PID bit and the inherent asynchronous nature of DMA operations relative to processor execution of operating system software. Any DMA cache conflicts are coincidental and do not affect data integrity for the current DMA operation or processor operation.

Figure 3A:
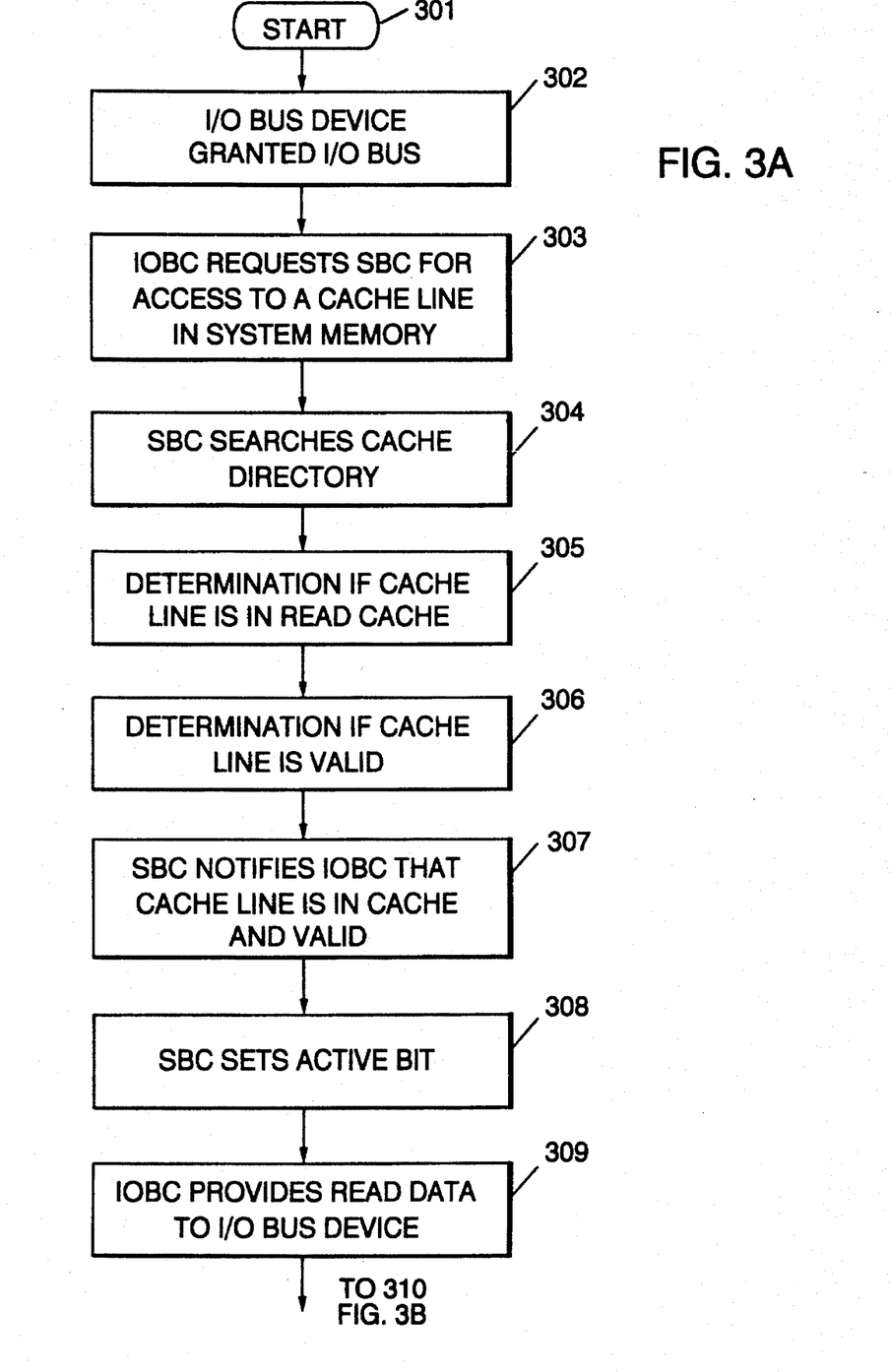
FIGS. 3A and 3B illustrate a flow diagram in accordance with the coherency mechanism of the present invention.
Figure 3B:
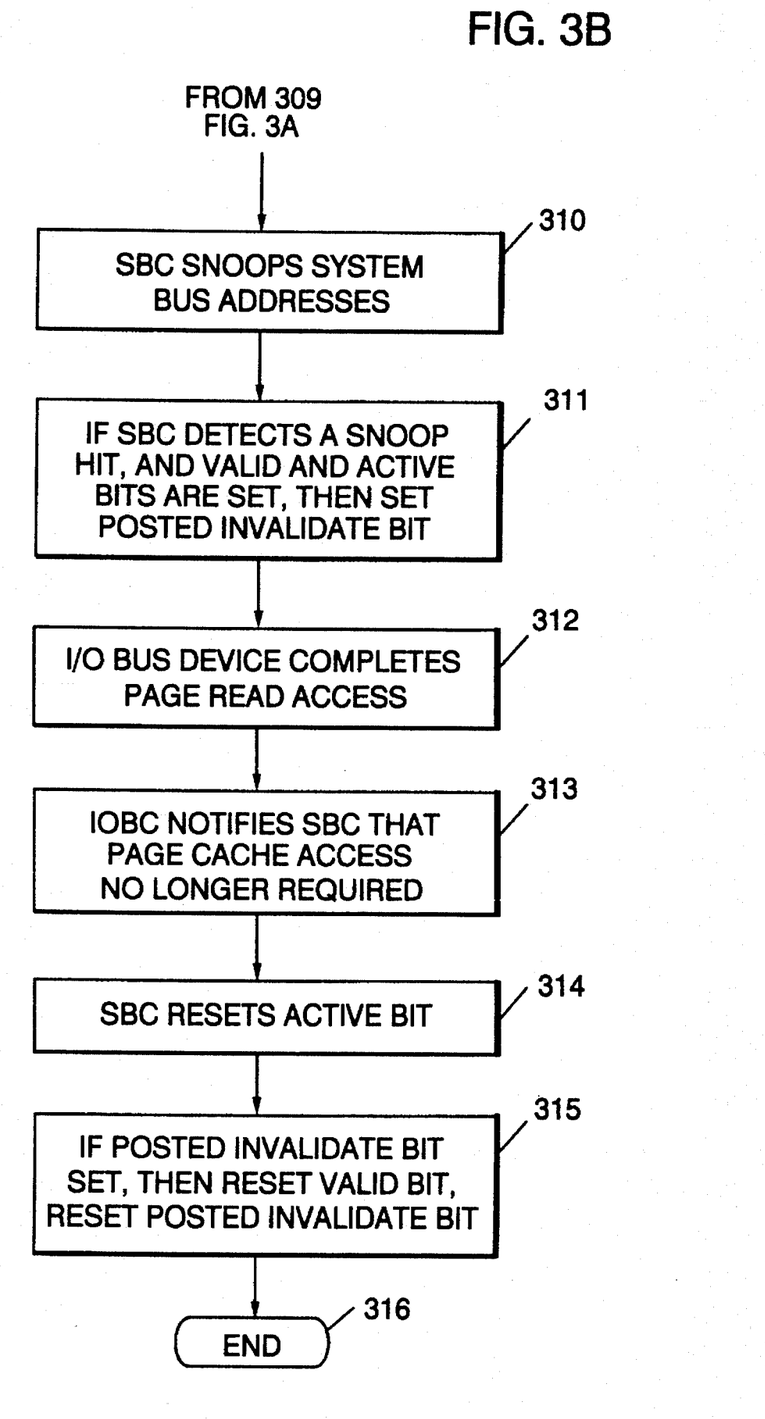

Referring next to FIG. 3, there is illustrated a flow diagram illustrating the aforementioned process. In step 301, the process starts and proceeds to step 302, wherein an I/O bus device is granted I/O bus 220. Next, in step 303, IOBC 201 requests SBC 202 for read access to a cache line in system memory 112, via system bus 108.

Thereafter, in step 304, SBC 202 also searches cache directory 205 to determine if the requested data is contained in cache 207. In step 305, a determination is made whether or not the requested cache line is in read cache 207. In step 306, a determination is made by SBC 202 if the requested cache line is valid, i.e., a determination is made whether or not the valid bit associated with the requested cache line has been set. This valid bit indicates that the copy of the requested data in data cache 204 is a copy of the most current version of that data.

In step 307, SBC 202 notifies IOBC 201 that the cache line is in cache 207 and is valid. In step 308, SBC 202 sets the active bit associated with the requested data in cache 207. This active bit indicates that the associated cache line is currently being accessed by an I/O bus device.

Thereafter, in step 309, IOBC 201 provides the requested data to the I/O bus device. Next, in step 310, SBC 202 is snooping system bus 108 for addresses being placed on system bus 108. Thereafter, in step 311, if SBC 202 gets an appropriate snoop hit on the address associated with the above requested data, and the valid and active bits have been set as described above, then the "Posted Invalidate" bit 211 is set. This "Posted Invalidate" bit will thereafter indicate to cache controller 203 to reset the appropriate valid and active bits once IOBC 201 relinquishes read access to the system memory page.

Next, in step 312, the I/O bus device completes page read access. In step 313, IOBC 201 notifies SBC 202 that page cache 207 access is no longer required. Thereafter, in step 314, SBC 202 resets the active bit, since the aforementioned requested cache line is no longer being accessed by the I/O bus device.

Next, in step 315, if the "Posted Invalidate" bit is set, then the valid bit is reset since that data may no longer be a copy of the most current version of that cache line. The Posted Invalidate bit is also reset. The process then ends in step 316.

The advantage of the new configuration of the present invention is that Retries are not required onto system bus 108, and SBC 202 is capable of efficiently managing system bus snoop operations and IOBC 201 cache line requests. In traditional IOCC designs, IOBC 201 instead of SBC 202 communicates to cache controller 203. This requires the SBC to sometimes make worse case guessing assumptions and inefficiently manage system bus snoop operations. Furthermore, dual ported arrays are not required, as discussed above.

Another feature of the present invention is that snoop granularity is kept imprecise. Imprecise is not necessarily beneficial if a Retry is utilized. However, with respect to reads from system memory, snooping is done on a larger granularity. On writes to system memory, snooping may be performed on a smaller granularity. Both of these situations are advantageous if there is no Retrying of system bus operations.

Another advantageous feature of the present invention regards I/O synchronization. I/O synchronization is well known in the art as a "race" between a processor being interrupted (by an I/O device) and the associated DMA write data being written to system memory through the IOCC. A processor can be interrupted, but a mechanism must exist to allow the processor to synchronize the IOCC (i.e., "drain" the IOCC's queued DMA write operations). This way, the processor would not access the DMA write data until after the processor has completed synchronizing the appropriate IOCC. Most conventional systems that provide memory coherency have an explicit mechanism for I/O synchronization.

Figure 4:
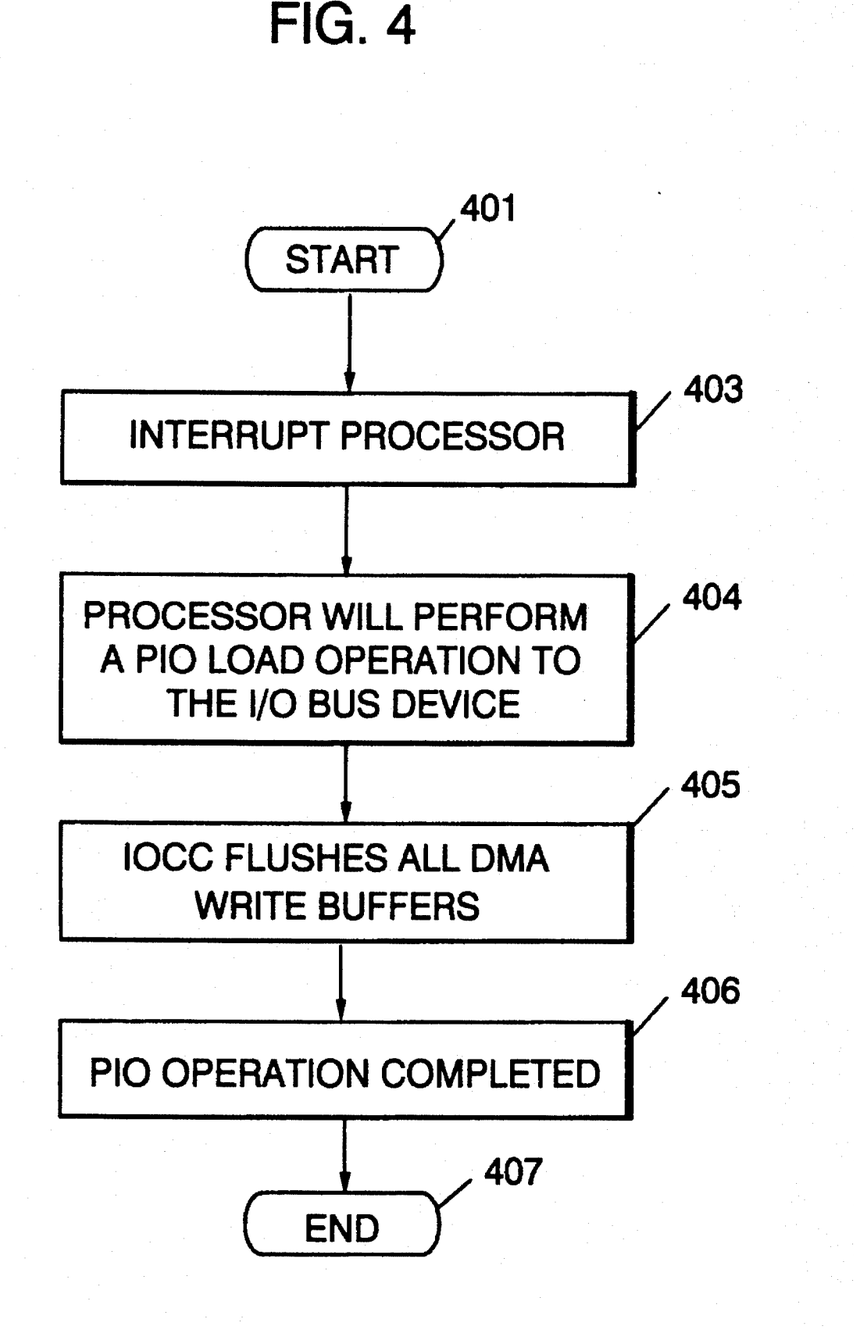
FIG. 4 illustrates a flow diagram in accordance with the synchronization mechanism of the present invention.

Referring to FIG. 4, the present invention provides I/O synchronization in a non-traditional manner. In most systems, the processor, upon receiving an interrupt from an I/O device will perform a PIO load operation to the interrupting I/O device (step 403). This PIO load operation is typically for "DMA completion" status information from the I/O device. In the present invention, IOCC 114, upon receiving a PIO load operation from the processor (step 404), such as processor 102, will perform the appropriate PIO load operation on I/O bus 220, but will not return the load data to processor 102 until all of the queued DMA write operations (within IOCC 114) have been flushed to memory 112 (step 405). Thus, when processor 102 receives the PIO load data (step 406), the DMA write data is valid in system memory 112. Thus, processor 102, upon receiving the PIO load data, can immediately access the DMA write data without issuing a synchronizing command to IOCC 114. This provides "seamless" I/O synchronization since processor 102 does not have to explicitly issue any I/O synchronizing commands to IOCC 114. Furthermore, system performance is improved due to a reduction in the interrupt processing latency by processor 102 (i.e., the absence of a specific synchronizing command to IOCC 114.

Although the present invention and its advantages have been described in detail, it should be understood that various changes, substitutions and alterations can be made herein without departing from the spirit and scope of the invention as defined by the appended claims.

What is claimed is:

1. An input/output ("I/O") channel controller, comprising:

an I/O bus controller adaptable for coupling to an I/O bus;

a system bus controller adaptable for coupling said I/O channel controller to a system bus;

one or more data caches; and a cache controller coupled to said one or more data caches, said cache controller coupled to said system bus controller, wherein said I/O bus controller, said system bus controller, said one or more data caches, and said cache controller are all located coextensively with said I/O channel controller.

2. The I/O channel controller as recited in claim 1, wherein said one or more data caches further comprises:

a read data cache coupled to said cache controller; and an I/O read data cache directory coupled to said cache controller.

3. The I/O channel controller as recited in claim 2, further comprising a means adaptable for coupling a multiprocessing system to said I/O channel controller via said system bus, and wherein said read data cache further comprises:

means for indicating that a stored cache line is the current version of said cache line in said multiprocessing system.

4. The I/O channel controller as recited in claim 3, further comprising a means adaptable for coupling an I/O device to said I/O channel controller via said I/O bus, and wherein said read data cache further comprises:

means for indicating that a stored cache line is currently being accessed by said I/O device.

5. The I/O channel controller as recited in claim 4, wherein said read data cache further comprises:

means for indicating that said stored cache line previously accessed by said I/O device is not the current version of said cache line in said multiprocessing system.

6. The I/O channel controller as recited in claim 2, further comprising:

means for implementing page level snooping of said I/O read data cache directory coupled to said cache controller.

7. A multiprocessing system, comprising:

one or more processors;

system memory;

a memory controller coupled to said system memory;

an I/O channel controller coupled to an I/O bus;

a system controller coupled to said one or more processors, said memory controller, and said I/O channel controller; and a system bus comprising an address bus and a data bus, said system bus coupled to said one or more processors, said memory controller, and said I/O channel controller, wherein said I/O channel controller further comprises:

an I/O bus controller coupled to said I/O bus;

a system bus controller coupled to said system bus;

a cache controller coupled to said system bus controller;

a read data cache coupled to said cache controller;

an I/O read data cache directory coupled to said cache controller;

means for indicating that a stored cache line is the current version of said cache line in said multiprocessing system;

means for indicating that said stored cache line is currently being accessed by said I/O device; and means for indicating that said stored cache line previously accessed by said I/O device is not the current version of said cache line in said multiprocessing system.

8. The multiprocessing system as recited in claim 7, wherein each of said indicating means are located coextensively with said I/O channel controller.

9. In a data processing system comprising one or more processors, system memory, a memory controller coupled to said system memory, an I/O channel controller coupled to an I/O bus, and a system bus comprising an address bus and a data bus, said system bus coupled to said one or more processors, said memory controller, and said I/O channel controller, wherein said I/O channel controller further comprises an I/O bus controller coupled to said I/O bus, a system bus controller coupled to said system bus, a cache controller coupled to said system bus controller, a data cache coupled to said cache controller, and a data cache directory coupled to said cache controller, a method comprising the steps of:

granting said I/O bus to an I/O device;

in response to a request from said I/O device, transferring, from said I/O bus controller to said system bus controller, a request for a portion of data stored within said system memory;

searching said data cache directory for an address corresponding to said portion of data to determine if said portion of data is stored within said data cache;

if said address corresponding to said portion of data is in said data cache directory, determining if said portion of data stored within said data cache is a copy of the current version of said portion of data;

if said portion of data stored within said data cache is a copy of the current version of said portion of data, setting an indication that said portion of data stored within said data cache is actively being accessed by said I/O device;

providing access to said portion of data stored within said data cache to said I/O device;

snooping, by said system bus controller, of said system bus; and if said system bus controller has a snoop hit, setting an indication that said portion of data stored within said data cache is not a copy of the current version of said portion of data.

10. The method as recited in claim 9, further comprising the steps of:

relinquishing, by said I/O device, of said I/O bus;

notifying, by said I/O bus controller, said system bus controller that data cache access to said portion of data is no longer required; and resetting said indication that said portion of data stored within said data cache is actively being accessed by said I/O device.

11. The method as recited in claim 9, wherein said snooping is performed on a page level basis.

12. In a data processing system comprising one or more processors, system memory, a memory controller coupled to said system memory, an I/O channel controller coupled to an I/O bus, and a system bus comprising an address bus and a data bus, said system bus coupled to said one or more processors, said memory controller, and said I/O channel controller, wherein said I/O channel controller further comprises an I/O bus controller coupled to said I/O bus, a system bus controller coupled to said system bus, a cache controller coupled to said system bus controller, a data cache coupled to said cache controller, and a data cache directory coupled to said cache controller, a method comprising the steps of completing, by said I/O bus device, a data transfer to said system memory; interrupting said one or more processors; said one or more processors sending a status request message to said I/O bus device; flushing, by said I/O channel controller, of said data cache; and sending a response, to said one or more processors sending said status request message, to said status request message.

13. In a data processing system comprising a plurality of microprocessors, system memory, a memory controller coupled to said system memory, an I/O channel controller coupled to an I/O bus, and a system bus comprising an address bus and a data bus, said system bus coupled to said plurality of microprocessors, said memory controller, and said I/O channel controller, wherein said I/O channel controller further comprises an I/O bus controller coupled to said I/O bus, a system bus controller coupled to said system bus, a cache controller coupled to said system bus controller, a read-only data cache coupled to said cache controller, and a read-only data cache directory coupled to said cache controller, a method comprising of steps of:

granting said I/O bus to an I/O device coupled to said I/O channel controller;

in response to a request from said I/O device, transferring from said I/O bus controller to said system bus controller a request for a portion of data stored within said system memory;

searching by said system bus controller of said read-only data cache directory in said I/O channel controller for an address corresponding to said portion of data to determine if said portion of data is stored within said read-only data cache;

if said address corresponding to said portion of data is in said read-only data cache directory, determining if said portion of data stored within said read-only data cache is a copy of the most current version of said portion of data;

notifying said I/O bus controller by said system bus controller that said portion of data is stored within said read-only data cache and is a copy of the most current version of said portion of data;

if said portion of data stored within said read-only data cache is a copy of the most current version of said portion of data, setting an indication within said I/O channel controller that said portion of data stored within said read-only data cache is actively being accessed by said I/O device;

providing access to said portion of data stored within said read-only data cache to said I/O device;

snooping, by said system bus controller within said I/O channel controller, of said system bus;

if said system bus controller within said I/O channel controller has a snoop hit on an address pertaining to said portion of data, and said portion of data stored within said read-only data cache is a copy of the most current version of said portion of data, and said portion of data stored within said read-only data cache is currently being accessed by said I/O device, setting an indication within said I/O channel controller that said portion of data stored within said read-only data cache is not a copy of the most current version of said portion of data;

completion by said I/O bus device of data cache access to said portion of data;

notifying, by said I/O bus controller, said system bus controller within said I/O channel controller that data cache access to said portion of data is no longer required by said I/O bus device;

resetting of said indication that said portion of data stored within said read-only data cache is actively being accessed by said I/O device; and resetting of said indication that said portion of data stored within said data cache is not a copy of the most current version of said portion of data.

* * * * *